(12) United States Patent
Linder et al.

(10) Patent No.: US 9,829,033 B2
(45) Date of Patent: Nov. 28, 2017

(54) DOUBLE-BEAM SLIDING MOUNT FOR ELECTRONIC VIDEO DISPLAYS AND OTHER ITEMS

(71) Applicant: Ergotron, Inc., St. Paul, MN (US)

(72) Inventors: Steven E Linder, Portland, OR (US); Brent Knight, St. Helens, OR (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 14/935,015

(22) Filed: Nov. 6, 2015

(65) Prior Publication Data

US 2016/0150879 A1 Jun. 2, 2016

Related U.S. Application Data

(60) Provisional application No. 62/085,425, filed on Nov. 28, 2014.

(51) Int. Cl.
| | |
|---|---|
| *A47F 5/00* | (2006.01) |
| *F16B 45/02* | (2006.01) |
| *F16M 11/08* | (2006.01) |
| *F16M 11/20* | (2006.01) |
| *F16M 11/24* | (2006.01) |
| *F16B 2/10* | (2006.01) |
| *A47B 21/04* | (2006.01) |
| *F16B 7/04* | (2006.01) |

(52) U.S. Cl.
CPC ............... *F16B 45/02* (2013.01); *F16B 2/10* (2013.01); *F16M 11/08* (2013.01); *F16M 11/2014* (2013.01); *F16M 11/2021* (2013.01); *F16M 11/2085* (2013.01); *F16M 11/24* (2013.01); *A47B 21/04* (2013.01); *A47B 2200/0086* (2013.01); *F16B 7/0433* (2013.01)

(58) Field of Classification Search
CPC .. A47B 81/062; A47B 81/065; F16M 13/022; F16M 13/02; F16B 45/02; H05J 5/0204
USPC ......... 248/201, 215, 222.51, 222.52, 225.11, 248/225.21, 322, 340, 227.1, 227.4, 214, 248/918, 690, 304, 305, 307
See application file for complete search history.

(56) References Cited

U.S. PATENT DOCUMENTS

| | | | | |
|---|---|---|---|---|
| 4,993,731 A | * | 2/1991 | Fuller ........................ | B62J 1/28 280/202 |
| 5,658,035 A | * | 8/1997 | Armstrong ............... | B62J 17/04 296/78.1 |
| 5,667,232 A | * | 9/1997 | Gogan ....................... | B62J 1/28 280/202 |
| 6,443,344 B1 | * | 9/2002 | Nicosia ..................... | B62J 1/28 224/413 |
| 6,484,914 B1 | * | 11/2002 | Willey ....................... | B62J 1/28 224/413 |

(Continued)

*Primary Examiner* — Kimberly Wood
(74) *Attorney, Agent, or Firm* — Schwegman Lundberg & Woessner, P.A.

(57) ABSTRACT

A mounting system includes a double-beam support structure comprising two parallel, horizontal bars spaced apart vertically, and a bracket designed to hang from the double support bars while resisting rotation about the support bars. The bracket is slidably positionable along the support bars and may further include a releasable clamp jaw for clamping one of the support bars to selectively fix the position of the bracket along the support bars. The bracket may support a mounting assembly for an electronic visual display, an extension boom assembly, or another item.

10 Claims, 8 Drawing Sheets

(56) References Cited

U.S. PATENT DOCUMENTS

| | | | | |
|---|---|---|---|---|
| 6,648,408 B1* | 11/2003 | Grove | ........................ | B62J 1/14 |
| | | | | 297/195.13 |
| 7,448,584 B2* | 11/2008 | Chen | ...................... | F16M 11/10 |
| | | | | 248/122.1 |
| 7,506,851 B1* | 3/2009 | Tooze | .................... | F24D 19/02 |
| | | | | 165/67 |
| 7,510,156 B1* | 3/2009 | Yaeger | ................... | F16M 11/04 |
| | | | | 248/201 |
| 7,823,847 B2* | 11/2010 | Bremmon | ............. | F16M 11/10 |
| | | | | 248/201 |
| 7,871,048 B2* | 1/2011 | Sculler | .................. | F16M 11/10 |
| | | | | 248/214 |
| 7,946,632 B1* | 5/2011 | Mueller | .................... | B62J 1/28 |
| | | | | 280/288.4 |
| 2003/0218109 A1* | 11/2003 | Farnham | ................. | B62J 17/04 |
| | | | | 248/205.1 |
| 2006/0087143 A1* | 4/2006 | Willey | .................... | B62J 17/04 |
| | | | | 296/78.1 |
| 2006/0163900 A1* | 7/2006 | van der Hoeven | ...... | B62J 17/00 |
| | | | | 296/78.1 |
| 2009/0079219 A1* | 3/2009 | Caprio | .................... | B62J 17/04 |
| | | | | 296/78.1 |
| 2010/0044536 A1* | 2/2010 | Huang | ................ | F16M 11/041 |
| | | | | 248/201 |
| 2011/0043978 A1* | 2/2011 | Bremmon | ............ | F16M 11/10 |
| | | | | 361/679.01 |
| 2014/0211100 A1* | 7/2014 | Massey | ................... | H04N 5/64 |
| | | | | 348/836 |
| 2015/0129342 A1* | 5/2015 | O'Rourke | ............... | B62J 17/04 |
| | | | | 180/219 |

* cited by examiner

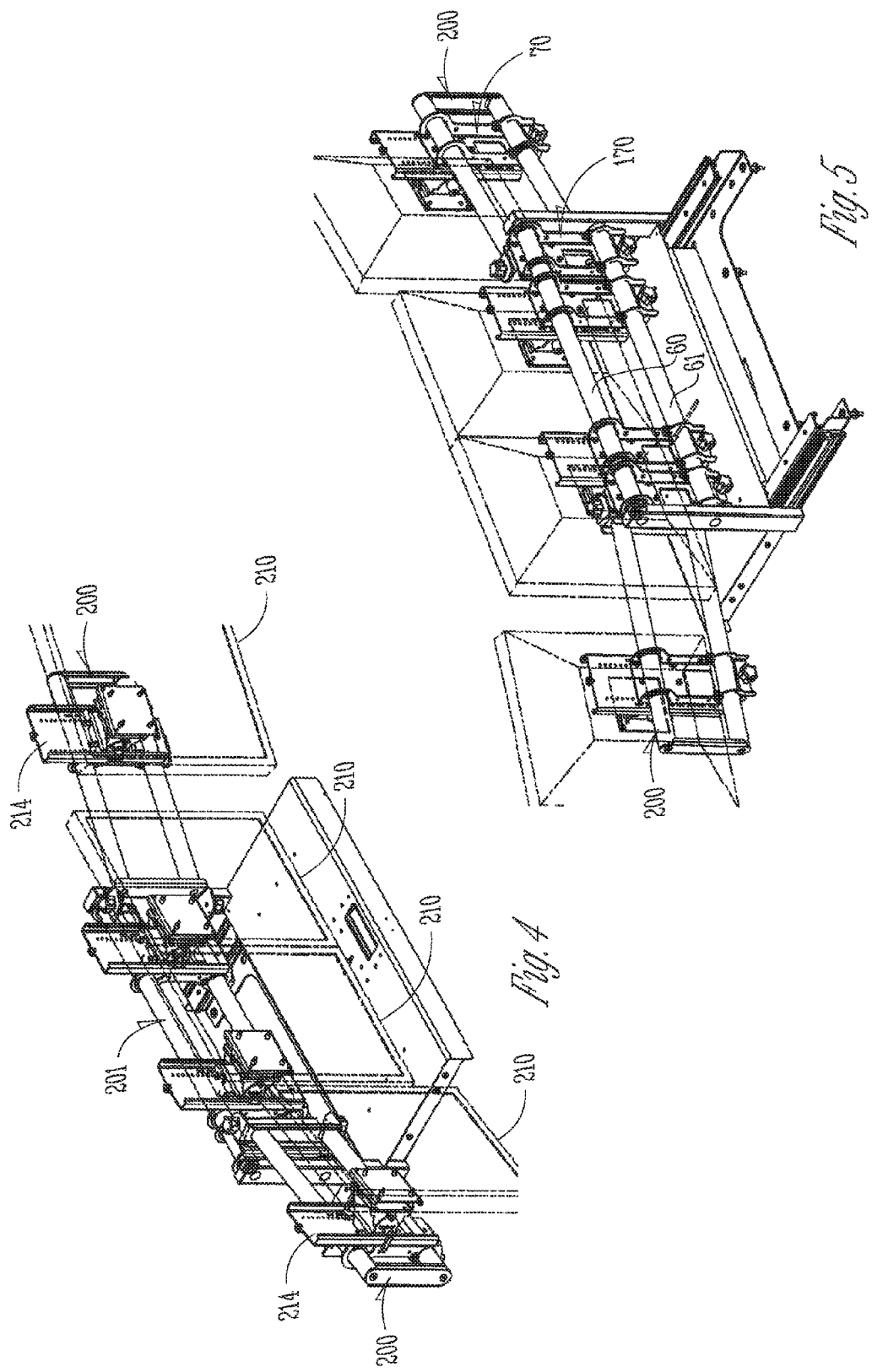

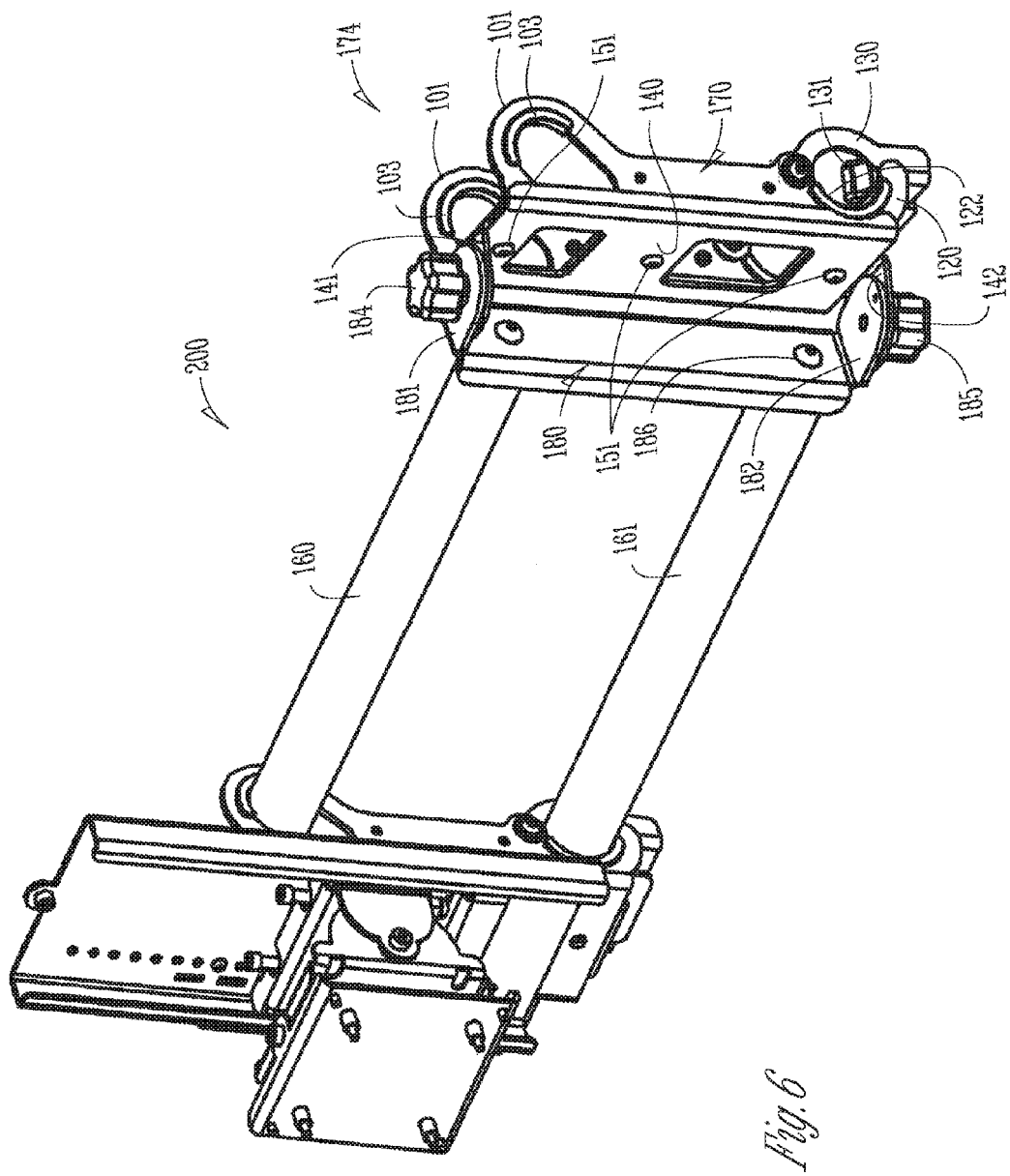

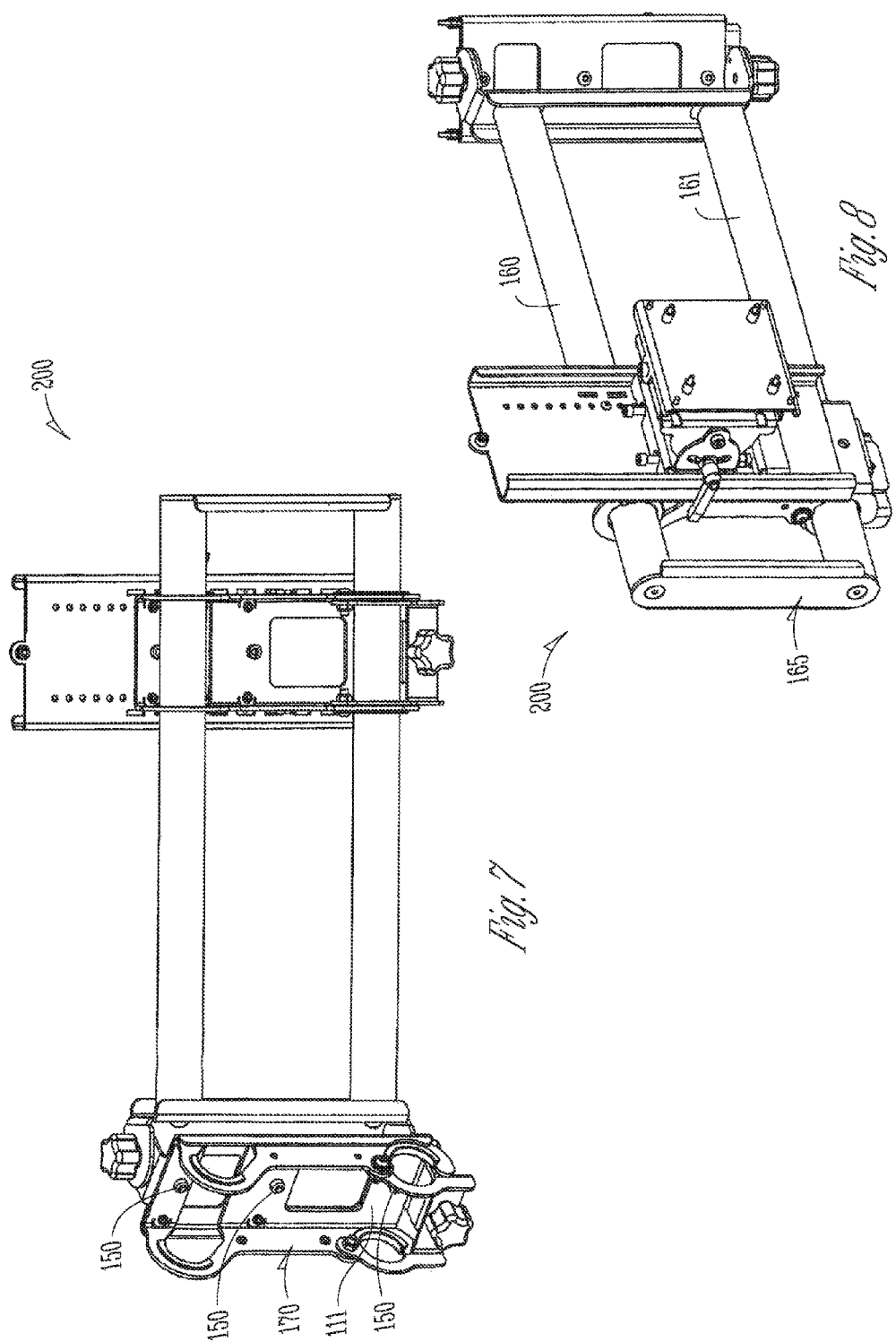

DOUBLE-BEAM SLIDING MOUNT FOR ELECTRONIC VIDEO DISPLAYS AND OTHER ITEMS

CLAIM OF PRIORITY

This patent application claims the benefit of priority of U.S. Provisional Patent Application Ser. No. 62/085,425 to Steven Linder and Brent Knight, titled "DOUBLE-BEAM SLIDING MOUNT FOR ELECTRONIC VIDEO DISPLAYS AND OTHER ITEMS" and filed on Nov. 28, 2014, which is hereby incorporated by reference herein in its entirety.

TECHNICAL FIELD

The field of this disclosure relates to mounting systems for adjustably positioning an electronic visual display or other item.

BACKGROUND

A common problem in this field is creating an adjustable mount such that the user can easily re-position the display laterally relative to a workspace. One set of solutions to the re-positioning problem utilizes an adjustable mount slidably attached to a single horizontal support bar so that the user can slide the mount laterally along the support bar. The support bar may comprise a tube with an oblong cross-section and the mount may have sliding surfaces shaped to fit the oblong tube. This arrangement enables a user to adjust the mount along one axis, typically by loosening a clamp or other fastening mechanism that fixes the position of the mount on the support bar, then sliding the mount along the bar.

Problems can arise with sliding mounts of this type, however, from the rotational force created by mounting a display on one side of the support bar. The strength and rigidity of the mounting system depend in part on the ability of the support bar to resist the tendency of the mount to rotate forward. The clamp or other fastening mechanism resists the rotational tendency of the mount by squeezing the support bar. This is significant because, in addressing the need to slide the mount along the support bar, a squeezing force at the surface of the support bar creates more friction and prevents sliding. Typically, the clamp or other fastening mechanism must be loosened to enable sliding. Yet the squeezing force of the fastening mechanism cannot be reduced without resulting in some rotation or shifting of the mount relative to the support bar. If the mount shifts forward, the user may have to support the weight of the display in order to slide it, otherwise the sliding surfaces of the mount may bind on the support bar. The present inventors have recognized that it would be advantageous to be able to slide the mount relative to the support bar without lifting the weight of the display. Thus the present inventors have perceived a need in the art for a sliding support system that securely supports the mounting assembly while being easier to slide.

SUMMARY

Aspects of the embodiments described below include a mounting system with a double-beam support structure comprising two parallel, horizontal bars spaced apart vertically, and a bracket designed to hang from the double support bars while resisting rotation about the support bars. The bracket is slidably positionable along the support bars and may further include a releasable clamp jaw for clamping one of the support bars to selectively fix the position of the bracket along the support bars.

A mounting knuckle or other mounting adapter can be attached to the bracket for attaching a computer monitor, video display, or other item to the double bar system. Alternatively, a swinging extension boom may be attached to the bracket. The extension boom may itself comprise a pair of vertically-spaced parallel horizontal bars for supporting a further bracket and computer monitor or other item thereon.

To further illustrate the DOUBLE-BEAM SLIDING MOUNT FOR ELECTRONIC VIDEO DISPLAYS AND OTHER ITEMS disclosed herein, a non-limiting list of examples is provided here:

In Example 1, a system for mounting and adjustably positioning an electronic visual display device or other item, can comprise: a first support bar extending generally horizontally; a second support bar extending parallel to the first support bar and spaced apart below the first support bar to define a gap therebetween; a bracket having front and rear sides, the bracket including a hook sized to hang from the first support bar and including an opening along the front side of the bracket, the opening facing in a forward direction relative to the first and second support bars when the bracket is attached to the support bars, the bracket further including a body portion attached to the hook and depending generally downwardly therefrom, the body portion including a lower portion that rests against a forward side of the second support bar when the bracket is attached to the support bars; and a clamp jaw attached to the body portion and facing the lower portion, the clamp jaw movable relative to the lower portion to clamp the second support bar therebetween when the bracket is attached to the support bars, the clamp jaw being selectively releasable to unclamp the second support bar and allow the bracket to be slidably moved along the first and second support bars.

In Example 2, the system of Example 1 can optionally be configured to further comprise a mounting platform attached to the bracket over the opening of the hook, the mounting platform closing the opening to prevent the bracket from being removed from the support bars.

In Example 3, the system of Example 2 can optionally be configured to further comprise a mounting knuckle connected to a front side of the mounting platform.

In Example 4, the system of any one or any combination of Examples 1-3 can optionally be configured to further comprise a plain bearing lining an inner surface of the hook.

In Example 5, the system of any one or any combination of Examples 1-4 can optionally be configured such that the bracket includes left and right side walls extending rearwardly from a central panel of the body portion, the hook comprises a first hook element formed in the left side wall and a second hook element formed in the right side wall.

In Example 6, the system of any one or any combination of Examples 1-5 can optionally be configured such that the bracket is made from sheet metal, blanked to form the opening of the hook and bent to form left and right side walls extending rearwardly from a central panel of the body portion, the hook including a first hook portion in the left side wall and a second hook portion in the right side wall, and further including a hook brace bar that connects ends of the first and second hook portions proximal of the opening.

In Example 7, the system of any one or any combination of Examples 1-6 can optionally be configured such that the lower portion includes a curved surface for increasing contact area between the lower portion and the second support bar.

In Example 8, the system of Example 7 can optionally be configured to further comprise a plain bearing lining the curved surface.

In Example 9, the system of any one or any combination of Examples 1-8 can optionally be configured such that the clamp jaw is pivotably attached to the body portion above the lower portion.

In Example 10, the system of any one or any combination of Examples 1-9 can optionally be configured to further include a threaded post extending rearwardly from the body portion and a knob threaded onto the threaded post, the threaded post and the knob joining the clamp jaw to the body portion and drawing the clamp jaw toward the lower portion.

In Example 11, the system of any one or any combination of Examples 1-10 can optionally be configured to further comprise a hinge attached to the body portion of the bracket, the hinge pivoting about a vertical axis; and a boom attached to the hinge.

In Example 12, a bracket for mounting an electronic visual display device or other item to a pair of parallel horizontal bars, including a first support bar and a second support bar spaced apart below the first support bar to define a gap therebetween, the bracket can comprise: a hook sized to hang from the first support bar and including an opening along a front side of the bracket, the opening facing in a forward direction relative to the first and second support bars when the bracket is attached to the support bars, the bracket further including a body portion attached to the hook and depending generally downwardly therefrom, the body portion including a lower portion that rests against a forward side of the second support bar when the bracket is attached to the support bars; and a clamp jaw attached to the body portion and facing the lower portion, the clamp jaw movable relative to the lower portion to clamp the second support bar therebetween when the bracket is attached to the support bars, the clamp jaw being selectively releasable to unclamp the second support bar and allow the bracket to be slidably moved along the first and second support bars.

In Example 13, the bracket of Example 12 can optionally be configured to further comprise a mounting platform attached over the opening of the hook, the mounting platform closing the opening to prevent the bracket from being removed from the support bars.

In Example 14, the bracket of Example 13 can optionally be configured to further comprise a mounting knuckle connected to a front side of the mounting platform.

In Example 15, the bracket of any one or any combination of Examples 12-14 can optionally be configured to further comprise a plain bearing lining an inner surface of the hook.

In Example 16, the bracket of any one or any combination of Examples 12-15 can optionally be configured to further comprise left and right side walls extending rearwardly from a central panel of the body portion, and wherein the hook includes a first hook element formed in the left side wall and a second hook element formed in the right side wall.

In Example 17, the bracket of any one or any combination of Examples 12-16 can optionally be configured such that the body portion and hook are made from a single sheet of metal, blanked to form the opening of the hook and bent to form left and right side walls extending rearwardly from a central panel of the body portion, the hook including a first hook portion in the left side wall and a second hook portion in the right side wall, and further including a hook brace bar that connects ends of the first and second hook portions proximal of the opening.

In Example 18, the bracket of any one or any combination of Examples 12-17 can optionally be configured such that the lower portion includes a curved surface for increasing contact area between the lower portion and the second support bar.

In Example 19, the bracket of Example 18 can optionally be configured to further comprise a plain bearing lining the curved surface.

In Example 20, the bracket of any one or any combination of Examples 12-19 can optionally be configured such that the clamp jaw is pivotably attached to the body portion above the lower portion.

In Example 21, the bracket of any one or any combination of Examples 12-20 can optionally be configured to further comprise a threaded post extending rearwardly from the body portion and a knob threaded onto the threaded post, the threaded post and the knob joining the clamp jaw to the body portion and drawing the clamp jaw toward the lower portion.

In Example 22, the bracket of any one or any combination of Examples 12-21 can optionally be configured to further comprise: a hinge attached to the body portion of the bracket, the hinge pivoting about a vertical axis; and a boom attached to the hinge.

In Example 23, the system or bracket of any one or any combination of Examples 1-22 can optionally be configured such that all elements, operations, or other options recited are available to use or select from.

Additional aspects and advantages will be apparent from the following detailed description of example embodiments, which proceeds with reference to the accompanying drawings.

BRIEF DESCRIPTION OF THE DRAWINGS

FIG. 4 is a front isometric view of a primary mounting system extended on each side by a double-boom extension with mounted displays shown in broken lines, in accordance with at least one example of this disclosure.

FIG. 5 is a rear perspective view of the primary mounting system and extensions of FIG. 4, in accordance with at least one example of this disclosure.

FIG. 6 is a front isometric view of an extension subassembly, according to another embodiment showing detail of a boom hinge thereof, in accordance with at least one example of this disclosure.

FIG. 7 is a rear elevation view of the extension subassembly of FIG. 6, in accordance with at least one example of this disclosure.

FIG. 8 is a front isometric view of the extension subassembly of FIG. 6 showing detail of an end of the boom extension, in accordance with at least one example of this disclosure.

DETAILED DESCRIPTION

Figure 1:
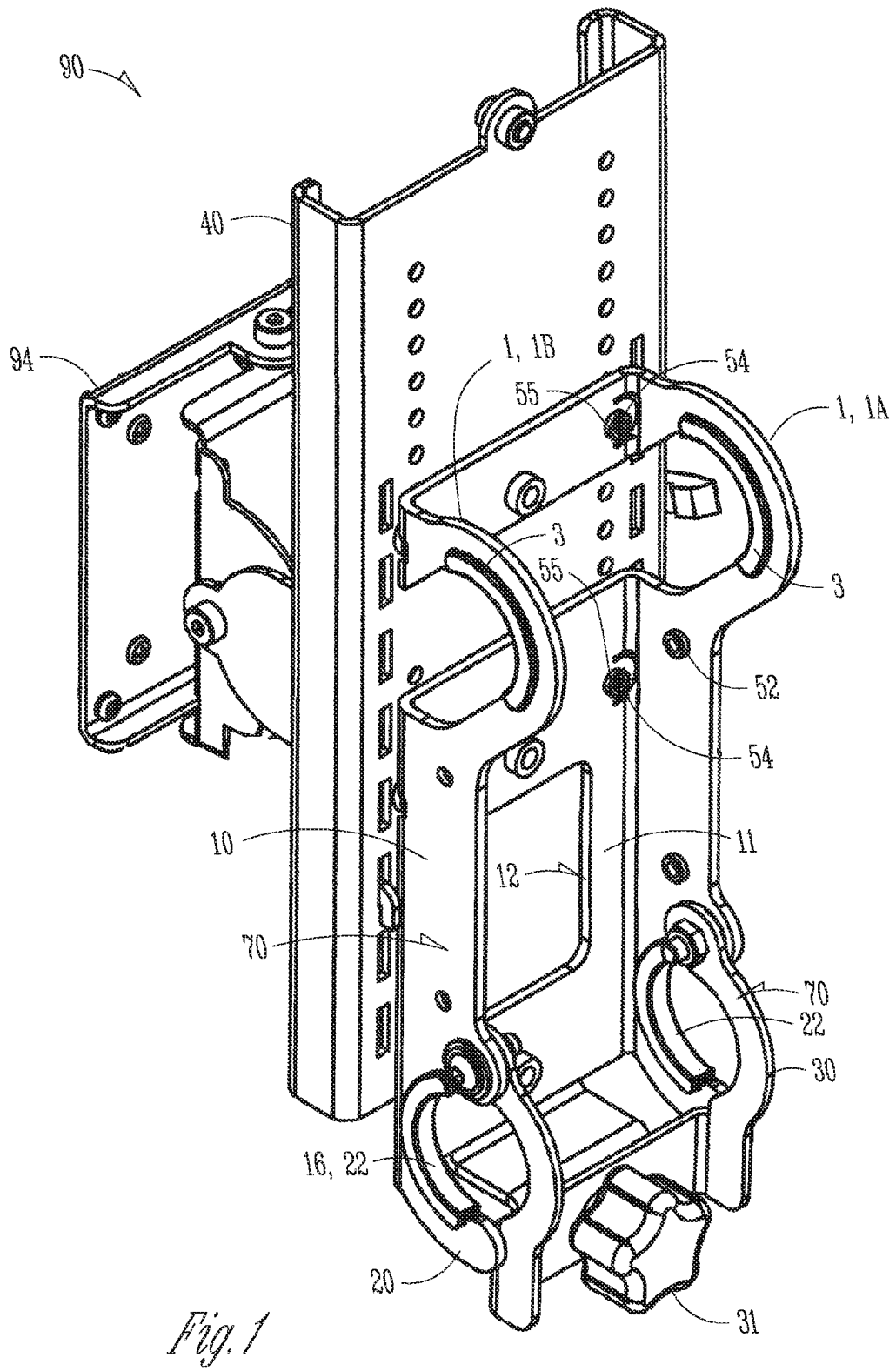
FIG. 1 provides a rear isometric view of a mounting assembly, in accordance with at least one example of this disclosure.
Figure 2:
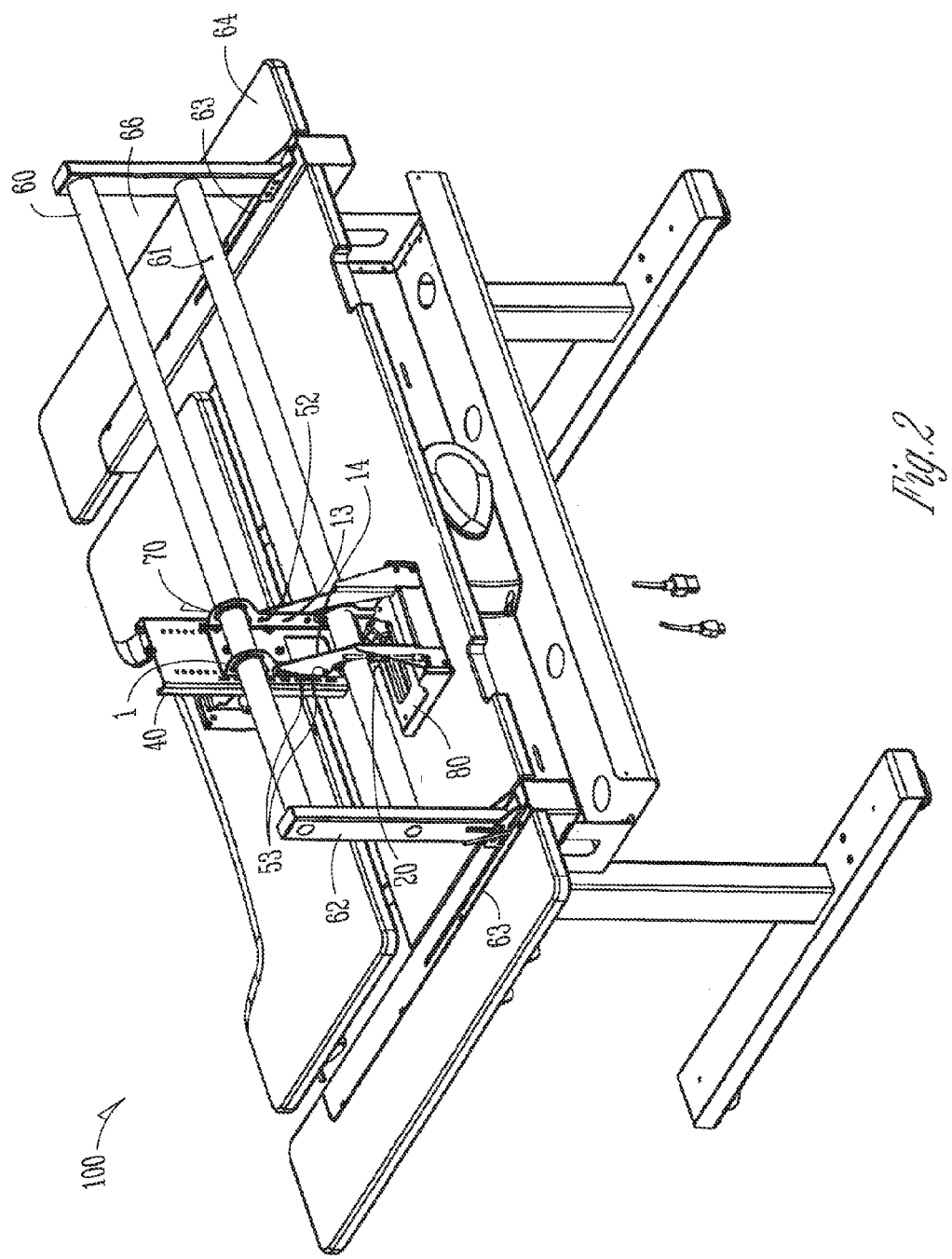
FIG. 2 provides a rear isometric view of a mounting system, incorporating the mounting assembly of FIG. 1 mounted to a double-beam support subassembly, which is supported on a desk, in accordance with at least one example of this disclosure.

FIGS. 1-9 illustrate embodiments of a mounting system 100 for electronic video displays, such as computer monitors, and for other items. With reference to FIGS. 1 and 2, the mounting system 100 includes a support structure comprising two parallel, horizontal bars 60 and 61 for supporting a mounting assembly 90. The bars 60 and 61 are spaced apart vertically in a generally upper-and-lower stacked arrangement to form a double-beam subassembly. A bracket 70 designed to hang from the support bars 60 and 61 combines with other mounting elements, such as a tilt-swivel mounting knuckle 94, to provide secure but adjustable attachment of a display 210 or other item to the double beam subassembly. In another embodiment illustrated in FIGS. 5-9, a bracket 170 with the same or similar features as bracket 70 combines with a boom hinge 174 to provide secure support for a swinging double-boom extension 200.

Figure 3:
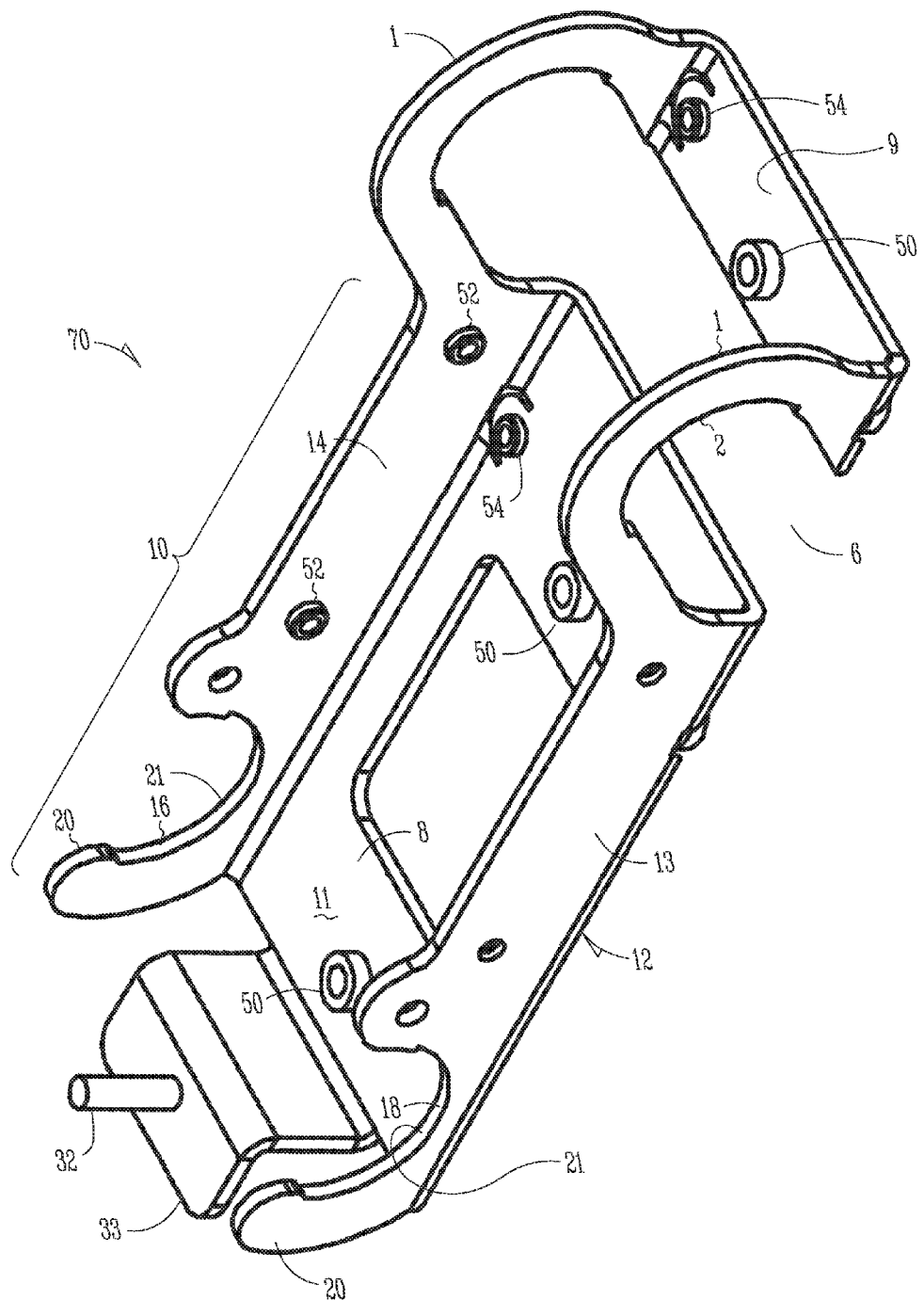
FIG. 3 is an enlarged rear isometric view of a bracket of the mounting assembly of FIG. 1, in accordance with at least one example of this disclosure.

FIGS. 1-3 illustrate the mounting assembly 90 including the bracket 70 according to a first embodiment. With reference to FIGS. 1 and 3, the bracket 70 has a rear side 11 and a front side 12. A hook 1 of the bracket 70 is shaped and sized to hang from the upper support bar 60. The hook 1 includes an opening 6 along the front side 12 of the bracket 70 and facing in a forward direction relative to the first and second support bars 60, 61 when the bracket 70 is attached to the support bars 60, 61. The bracket 70 further includes a body portion 10 attached to the hook 1 and depending generally downwardly therefrom. The body portion 10 includes a lower portion 20 having a rearward-facing bearing surface 18 that rests against a forward side of the lower support bar 61 when the bracket is attached to the support bars 60, 61, as described in further detail below.

The use of parallel support bars 60, 61 with the bracket 70 spanning a gap 66 between the support bars 60, 61 effectively constrains rotation of the bracket 70 and removes the need for a specially shaped non-round support tube of the kind used in single bar mounting systems. The support bars 60, 61 may thus be made of round bar stock or tube stock, which may reduce manufacturing cost of mounting system 100 and overcome one or more shortcomings of prior-art systems.

With reference to FIG. 3, the bracket 70 can be made from a single unitary piece of sheet metal. The sheet of metal can be punched or cut, or a section of it otherwise removed, to create the opening 6 of the hook 1. The sheet can be formed to include left and right side walls 13, 14 extending rearwardly from a central panel 8 of the body portion 10. The hook 1 of this embodiment includes a first hook portion 1a in the left side wall 13 and a second hook portion 1b in the right side wall 14. A hook brace bar 9 can connect ends of the first and second hook portions 1a, 1b proximal of the opening 6. The lateral span of the hook 1, such as the distance between the first and second hook portions 1a, 1b in the embodiment of FIG. 3, can provide stability that can inhibit the hook 1 from canting on the bar about a vertical plane containing the bars 60, 61. In other embodiments (not shown), the hook 1 may comprise a different structure. For example, the hook 1 may be made of a unitary block of metal, plastic, or other material forming a single hook block having a width of several inches. Alternatively, the hook 1 may comprise a set of tabs or other hanger-like structures.

With reference again to FIG. 1, a slide bearing, such as a plain bearing 3 made of PTFE or another plastic material, can be fitted onto the inner surface of each of the first and second hook portions 1a, 1b. Plain bearings 3 can reduce friction between hook 1 and support bar 60 when the bracket 70 is mounted on double support bars 60, 61 and thereby can facilitate sliding adjustment along the support bars 60, 61. FIG. 3 illustrates notches 2 in the hook portions 1a, 1b sized to receive plain bearings 3. Another pair of slide bearings, such as second plain bearings 22, are fitted on rear-facing curved surfaces 16 of the lower portion 20. The curved surfaces 16 may be formed in the left and right side walls 13, 14. Notches 21 in the lower portion 20 can be sized to receive and retain the second plain bearings 22. Each of the plain bearings 3 can be positioned to reduce friction at the points of contact between the hook 1 and the upper support bar 60. Similarly, the second plain bearings 22 can be positioned to reduce friction at the points of contact between the lower portion 20 and the lower support bar 61. Bearings 3 and 22 in the embodiment shown are plastic, but in other embodiments bearings 3 and 22 may include other structures or materials, such as metal, rubber, polymer, composite, or a combination of materials. A clamp including a clamp jaw 30 can be provided at the lower portion 20. A user can tighten the clamp by rotating a knob 31, which can be threaded onto a threaded post 32, so as to bring the clamp jaw 30 into proximity with an elbow 33 and thereby clamp the lower support bar 61 between the clamp jaw 30 and the lower portion 20. The clamp jaw 30 may be pivotably attached to the body portion 10 above lower portion 20, or alternatively pivotably attached at an end of lower portion 20. The threaded post 32 extends rearwardly from the elbow 33 of body portion 10, and the knob 31 can be threaded onto the threaded post 32 so as to join the clamp jaw 30 to the elbow 33 of the body portion 10. When the knob 31 is tightened, it draws the clamp jaw 30 toward the lower portion 20 and clamps the lower support bar 61 therebetween.

FIG. 2 illustrates the upper support bar 60 and the lower support bar 61 positioned in a vertically stacked arrangement. The mounting assembly 90 (see FIG. 1) can be mounted on support bars 60 and 61. In this embodiment, the first hook 1 hangs on the upper support bar 60 and the lower portion 20 rests on the lower support bar 61. Uprights 62 support the ends of the support bars 60, 61 double-beam subassembly and ride in a pair of tracks 63 in a table 64, which allows for adjustment of a depth position of the mounting system 100. The vertical spacing between support bars 60 and 61 can be configured to prevent rotation between the bracket 70 and support bars 60 and 61. The amount of spacing between support bars 60 and 61 can be configured to provide strength and rigidity. Consequently, when the bracket 70 of FIG. 1 is installed on two support bars as shown in FIG. 2, the bracket 70 sits upright with the hook 1 positioned vertically above and spaced apart from the lower portion 20. To install the bracket 70 on support bars 60 and 61, the installer first can open the clamp 30, and loosen the knob 31 as necessary. The installer can hold the bracket 70 in the gap 66 between support bars 60 and 61, with the hook 1 toward the rear side of the support bars 60 and 61 and the lower portion 20 toward the front side of the support bars 60 and 61, and with the hook 1 opening upwards toward the upper support bar 60. From this position, the installer can rotate the bracket 70 forward while holding the clamp 30 open over the lower support bar 61 until the hook 1 hangs on the upper support bar 60. The installer can then release the bracket 70, causing the lower portion 20 to rest naturally against the lower support bar 61, and allowing the clamp 30 to close against a rear side of the lower support bar 61. Because the mounting system 100 imparts a rotational load to the support bars 60 and 61 as well as a vertical, gravitational load, the embodiment of FIG. 1 shows that the hook 1 and a concave curved surface of the lower portion 20 open toward opposite sides of the bracket 70. This can be an advantage for resisting a forward pull on the upper portion of the bracket 70 and for resisting a rearward pull on the lower portion of the bracket 70. In this embodiment, unlike many single bar mounting systems, the clamp 30 is not essential for supporting either the rotational or the vertical load but may be opened or closed freely without disturbing the position of the bracket 70 relative to support bars 60 and 61.

Bearings 3 can be offset within the hook 1 to correspond to the point of contact with the support bars 60 and 61 and the center of the load thereon. Specifically, the bearing 3 can be offset to the rear of top center on the hook 1. The lower portion 20 can include a curved surface onto which second plain bearing 22 is fitted.

When the bracket 70 is installed on a dual support bar system, as in FIG. 2, the tightening of the clamp 30 can also compress the lower support bar 61 between the lower portion 20 and the clamp 30. This can provide additional securing means for the mounting system in at least three ways. First, it can prevent the bracket 70 from accidentally sliding along the support bars 60 and 61. Second, it can prevent the bracket 70 from accidentally disengaging from the lower support bar 61 (for example, in the event that the mount is bumped from below or from behind). Third, it can provide structural rigidity to the dual support bar assembly by tying the upper support bar 60 and the lower support bar 61 together through the bracket 70.

FIG. 3 shows portions of the bracket 70 of FIG. 1. Nuts 52 can be pressed into or otherwise attached to the inside surfaces of the left side wall 13 and the right side wall 14. The nuts 52 can receive screws 53 to attach an additional optional adjustment control, such as a brake release 80, shown in FIG. 2. The brake release 80 can connect to a brake mechanism within the tracks 63. A user may actuate the brake release 80 to release the brake mechanism and pull or push the double-beam subassembly forward or rearward relative to the table 64. FIG. 3 also illustrates nuts 54 for receiving screws 55 to attach other features of the mounting system such as a mounting platform 40 shown in FIG. 1, which can include a slotted rack. Attaching the mounting platform 40 to the bracket 70 can provide the advantage of closing the opening 6 of the hook 1. When the bracket 70 is mounted on a double bar support system, as shown for example in FIG. 2, mounting platform 40 can be mounted over the opening of the hook 1 to close a loop. Such closure can prevent the bracket 70 from becoming accidentally dislodged from the upper support bar 60 (for example, in the event that the mount is bumped from below or from the front). FIG. 3 also shows nuts 50 for receiving screws to attach an extension plate 140, as described below with reference to FIG. 6.

FIGS. 4-5 illustrate front and rear views of extension subassemblies 200 providing double-boom sliding mount support for extension display mounts 214 on either side of a primary sliding mount assembly 201. This view shows brackets 70 and 170, which have the same or similar features, used for mounting displays as well as for mounting double-boom extensions. This view also shows the vertical spacing between the upper support bar 60 and the lower support bar 61 in relation to the extension subassembly 200. The double support bars 60 and 61 and the spacing between them provide ample strength and rigidity to support the extension subassembly 200 securely.

Figure 9A:
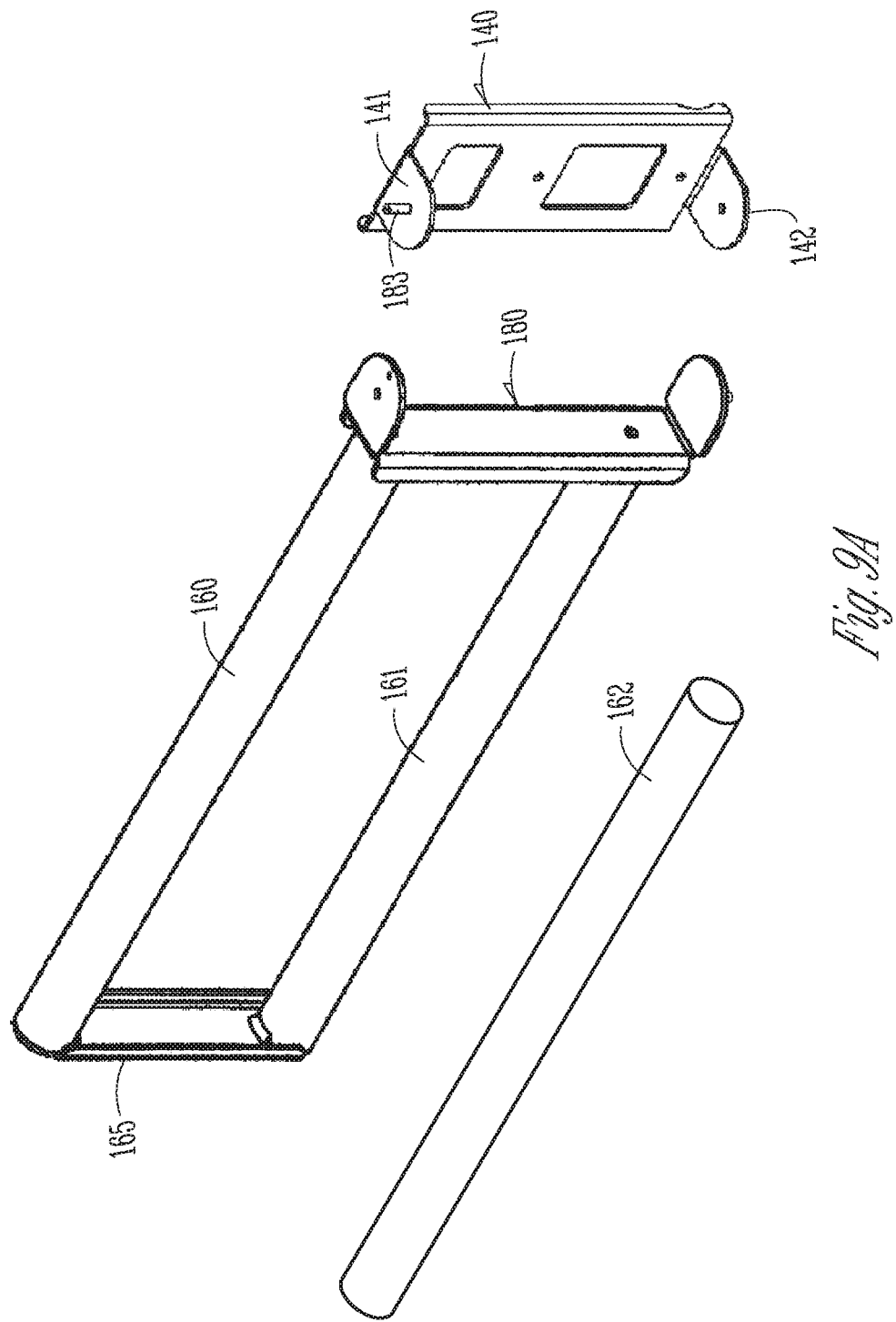
FIG. 9A shows an exploded view of the components of the extension subassembly of FIG. 6, in accordance with at least one example of this disclosure.

FIG. 6 illustrates the extension subassembly 200 for use in one embodiment of a double-boom sliding mount. The extension subassembly 200 provides the bracket 170, having the same features as the bracket 70. A first hook 101, fitted with a bearing 103, and a lower portion 120, fitted with a bearing 122, can be positioned for sliding adjustment on two support bars of the boom. The bracket 170 attaches to an extension plate 140 with screws 151, which thread into nuts 150 which are pressed into a rear side 111 of the bracket 170 (FIG. 7). Returning to FIG. 6, the extension plate 140 can include a top flange 141 and a bottom flange 142. An extension bracket 180 forms a boom hinge 174 with the extension plate 140, by overlapping its top flange 181 with the top flange 141 and its bottom flange 182 with the bottom flange 142. The boom hinge 174 pivots about a vertical axis to allow the boom to be repositioned. FIGS. 9A-D show the extension bracket 180 in greater detail, including a post 183 which can protrude from the bottom flange 182. FIGS. 9A-D show the extension bracket 180 attached to two booms, an upper boom 160 and a lower boom 161. In another embodiment (not shown), the extension boom may comprise a single boom bar, a swing arm mechanism, or other extension structure. As shown in the embodiment of FIG. 6, the upper boom 160 and the lower boom 161 can be attached to the extension bracket 180 with screws 186. FIG. 9A also shows star nuts 162 which can be embedded in support tubes 160 and 161 (FIG. 6) for receiving screws 186 (FIG. 6). Welding is another means for attaching the upper boom 160 and the lower boom 161 to the extension bracket 180. FIG. 6 also shows an upper knob 184, which can engage a post 183 on the top flange 141 of the extension plate 140. A lower knob 185 can engage the post 183 on the bottom flange 182 of the extension bracket 180.

Together the extension bracket 180 and the extension plate 140 create a hinge joint, and knobs 184 and 185 enable adjustment of the tightness of the joint as needed to enable or prevent rotation of the extension bracket 180 relative to the bracket 170.

Figure 9D:
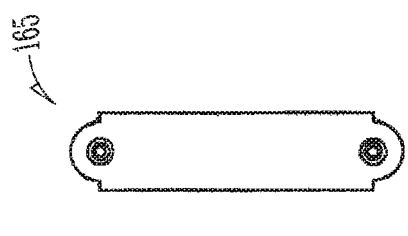
FIG. 9D shows a right side elevation view of components of the extension subassembly of FIG. 6, in accordance with at least one example of this disclosure.
Figure 9B:
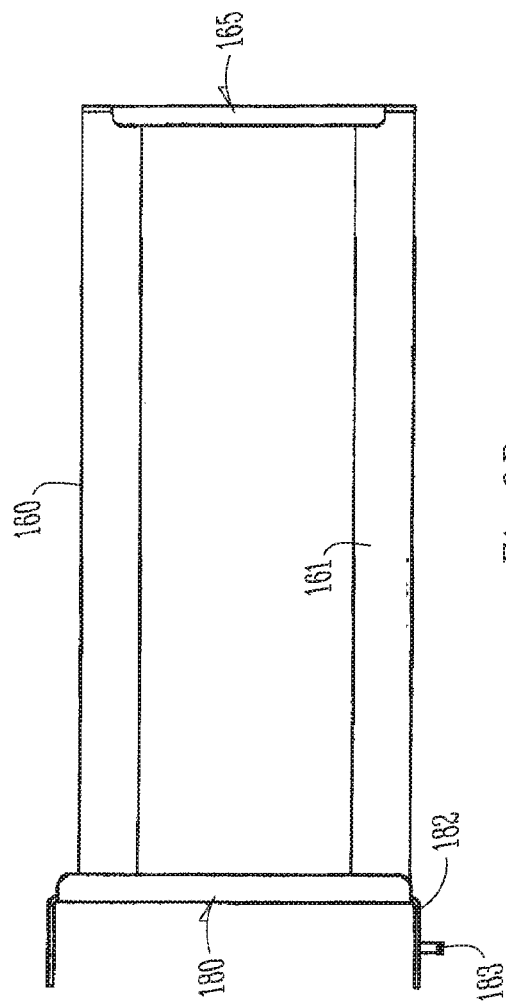
FIG. 9B shows a front elevation view of components of the extension subassembly of FIG. 6, in accordance with at least one example of this disclosure.
Figure 9C:
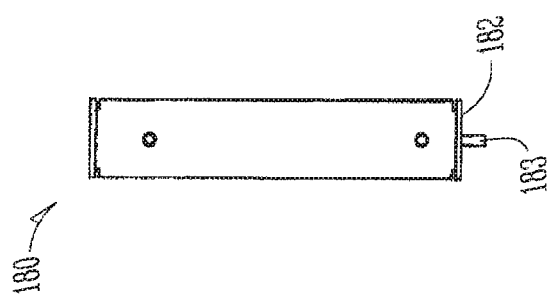
FIG. 9C shows a left side elevation view of components of the extension subassembly of FIG. 6, in accordance with at least one example of this disclosure.

FIGS. 7 and 8 show additional perspective views of the extension subassembly 200 from different viewing angles. FIG. 8 shows an end bracket 165 which ties together the terminal ends of the upper boom 160 and the lower boom 161. FIGS. 9A and 9D show additional views of the end bracket 165.

Exemplary embodiments are described above with reference to a mounting system for electronic visual display devices, such as flat panel computer monitors. However, the same or similar mounting systems may be used to mount and adjust the position of a variety of other items, such as other electronics, medical equipment, cameras, and any other item that a user may wish to mount and position relative to a support beam, or on a pivoting support boom. It will be obvious to those having skill in the art that many changes may be made to the details of the above-described embodiments without departing from the underlying principles of the invention.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A bracket for mounting an electronic visual display device to a pair of parallel horizontal bars, including a first support bar and a second support bar spaced apart vertically below the first support bar to define a gap therebetween, the bracket comprising:
   a hook sized to hang from the first support bar and including an opening along a front side of the bracket, the opening facing in a forward direction relative to the first and second support bars when the bracket is attached to the support bars, the bracket further including a body portion attached to the hook and depending generally downwardly therefrom, the body portion including a lower portion that rests against a forward side of the second support bar when the bracket is attached to the support bars;
   a clamp jaw attached to the body portion and facing the lower portion, the clamp jaw movable relative to the lower portion to clamp the second support bar therebetween when the bracket is attached to the support bars, the clamp jaw being selectively releasable to unclamp the second support bar and allow the bracket to be slidably moved laterally along the first and second support bars;
   left and right side walls extending rearwardly from a central panel of the body portion, and wherein the hook includes a first hook element formed in the left side wall and a second hook element formed in the right side wall;
   a mounting platform attached to the bracket over the opening of the hook, the mounting platform closing the opening to prevent the bracket from being removed from the support bars; and
   a mounting element coupled to the mounting platform and configured to support the electronic visual display device.

2. The bracket of claim 1, wherein the mounting element includes a mounting knuckle connected to a front side of the mounting platform.

3. The bracket of claim 1, further comprising a plain bearing lining an inner surface of the hook.

4. The bracket of claim 1, wherein the body portion and hook are made from a single sheet of metal, blanked to form the opening of the hook and bent to form the left and right side walls extending rearwardly from the central panel of the body portion, and further including a hook brace bar that connects ends of the first and second hook elements proximal of the opening.

5. The bracket of claim 1, wherein the lower portion includes a curved surface for increasing contact area between the lower portion and the second support bar.

6. The bracket of claim 5, further comprising a plain bearing lining the curved surface.

7. The bracket of claim 1; wherein the clamp jaw is pivotably attached to the body portion above the lower portion.

8. The bracket of claim 1, further including a threaded post extending rearwardly from the body portion and a knob threaded onto the threaded post, the threaded post and the knob joining the clamp jaw to the body portion and drawing the clamp jaw toward the lower portion.

9. The bracket of claim 1, further comprising:
a hinge attached to the body portion of the bracket, the hinge pivoting about a vertical axis; and
a boom attached to the hinge.

10. A bracket for mounting an electronic visual display device to a pair of parallel horizontal bars, including a first support bar and a second support bar spaced apart vertically below the first support bar to define a gap therebetween, the bracket comprising:
- a hook sized to hang from the first support bar and including an opening along a front side of the bracket, the opening facing in a forward direction relative to the first and second support bars when the bracket is attached to the support bars, the bracket further including a body portion attached to the hook and depending generally downwardly therefrom, the body portion including a lower portion that rests against a forward side of the second support bar when the bracket is attached to the support bars;
- a clamp jaw attached to the body portion and facing the lower portion, the clamp jaw movable relative to the lower portion to clamp the second support bar therebetween when the bracket is attached to the support bars, the clamp jaw being selectively releasable to unclamp the second support bar and allow the bracket to be slidably moved laterally along the first and second support bars;
- a mounting platform attached to the bracket over the opening of the hook, the mounting platform closing the opening to prevent the bracket from being removed from the support bars; and
- a mounting element coupled to the mounting platform and configured to support the electronic visual display device; and
wherein the body portion and hook are made from a single sheet of metal, blanked to form the opening of the hook and bent to form left and right side walls extending rearwardly from a central panel of the body portion; the hook including a first hook portion in the left side wall and a second hook portion in the right side wall, and further including a hook brace bar that connects ends of the first and second hook portions proximal of the opening.

\* \* \* \* \*

UNITED STATES PATENT AND TRADEMARK OFFICE
CERTIFICATE OF CORRECTION

PATENT NO. : 9,829,033 B2
APPLICATION NO. : 14/935015
DATED : November 28, 2017
INVENTOR(S) : Linder et al.

Page 1 of 1

It is certified that error appears in the above-identified patent and that said Letters Patent is hereby corrected as shown below:

In the Claims

In Column 10, Line 60, in Claim 7, delete "1;" and insert --1,-- therefor

In Column 12, Line 16, in Claim 10, delete "portion;" and insert --portion,-- therefor Signed and Sealed this
Eighth Day of December, 2020

Andrei Iancu
*Director of the United States Patent and Trademark Office*